No. 874,747. PATENTED DEC. 24, 1907.
J. A. DE VITO.
VARIABLE SPEED TRANSMITTING GEARING.
APPLICATION FILED JAN. 12, 1906.
2 SHEETS—SHEET 1.
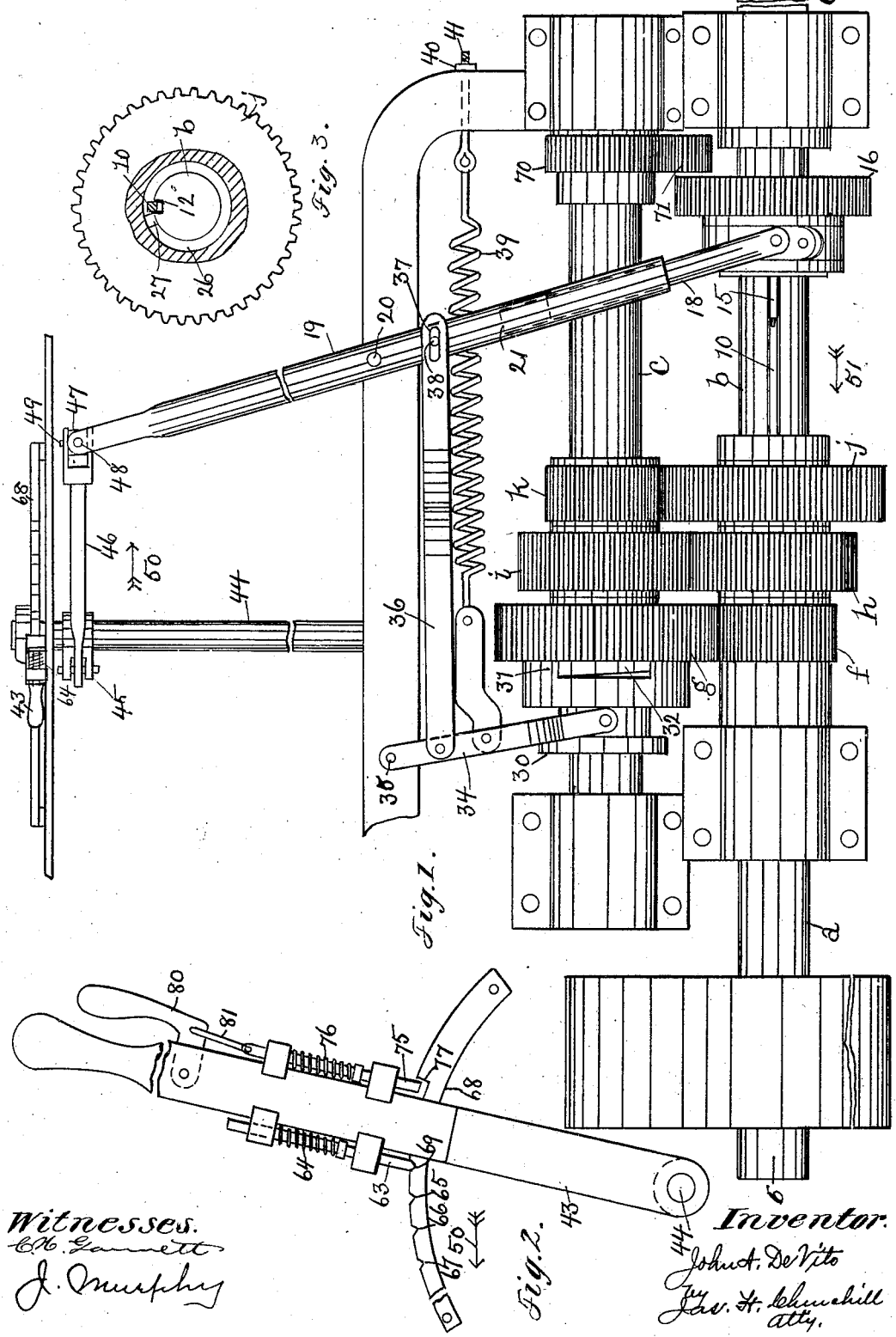

No. 874,747. PATENTED DEC. 24, 1907.
J. A. DE VITO.
VARIABLE SPEED TRANSMITTING GEARING.
APPLICATION FILED JAN. 12, 1906.
2 SHEETS—SHEET 2.
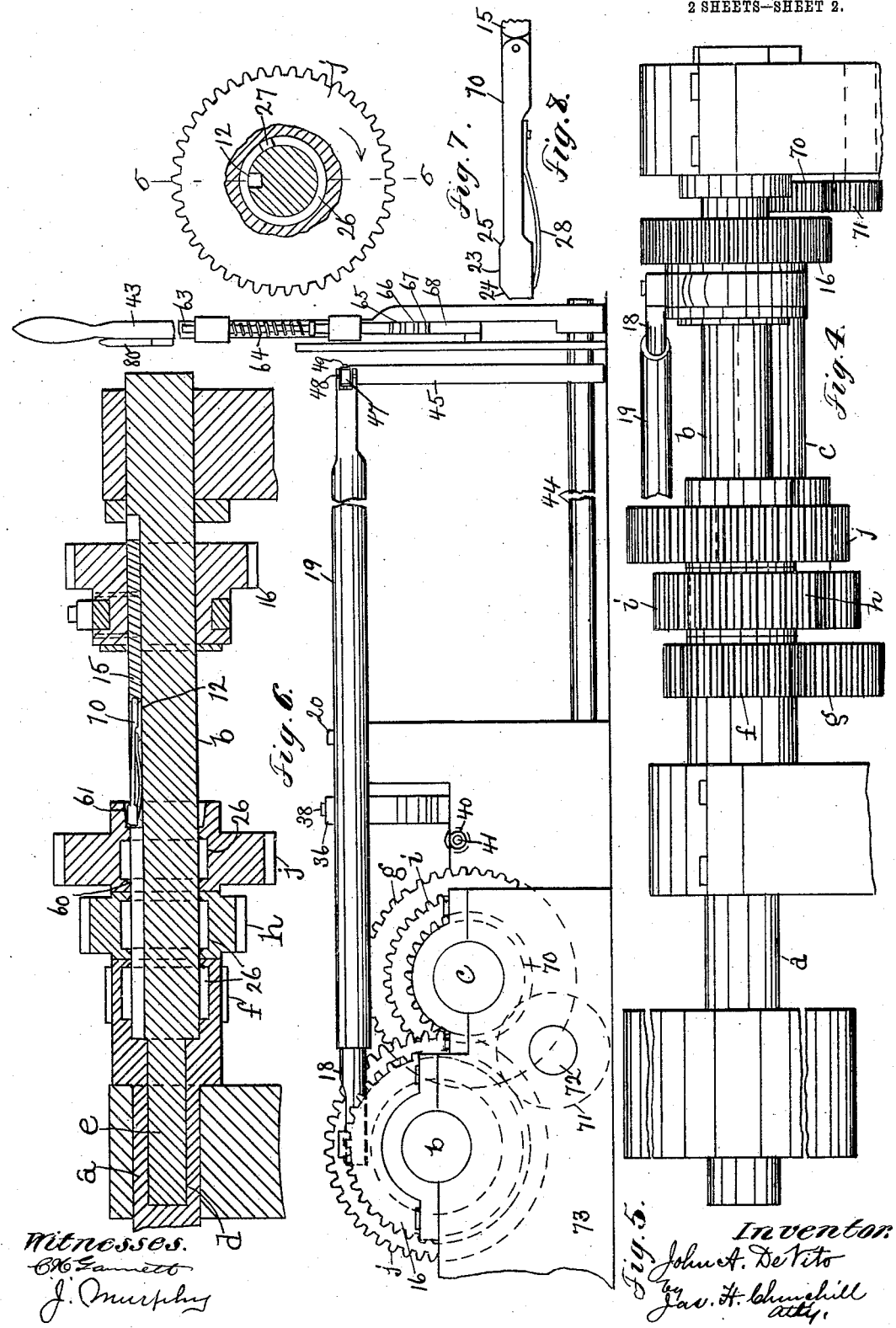
Witnesses.
Inventor:
John A. De Vito

UNITED STATES PATENT OFFICE.

JOHN A. DE VITO, OF BOSTON, MASSACHUSETTS.

VARIABLE-SPEED-TRANSMITTING GEARING.

No. 874,747.  Specification of Letters Patent.  Patented Dec. 24, 1907.

Application filed January 12, 1906. Serial No. 295,698.

*To all whom it may concern:*

Be it known that I, JOHN A. DE VITO, a citizen of the United States, residing in Boston, in the county of Suffolk and State of Massachusetts, have invented an Improvement in Variable-Speed-Transmitting Gearing, of which the following description, in connection with the accompanying drawings, is a specification, like letters on the drawings representing like parts.

This invention relates to a variable speed transmitting gearing especially designed and adapted among other uses to be employed in automobile vehicles. For this purpose I employ a plurality of spur gears arranged on substantially parallel shafts with their teeth in mesh, and provide means as will be described for connecting the driven shaft with the driving shaft through one of said gears according to the speed desired.

Provision is made for insuring operation of the speed-changing device while the driving shaft is operating at a high speed.

These and other features of this invention will be pointed out in the claims at the end of this specification.

Figure 1 is a plan view of a speed-changing gearing embodying this invention. Figs. 2 and 3, details to be referred to. Fig. 4, a front elevation of the gearing shown in Fig. 1. Fig. 5, a side elevation looking toward the left in Fig. 1. Fig. 6, a longitudinal section on the line 6—6—, Figs. 1 and 7. Fig. 7, a detail in cross-section to be referred to, and Fig. 8, a detail of the key shown in Fig. 6.

Referring to Fig. 1, $a$ represents the main or driving shaft, $b$, the shaft to be driven and $c$, a counter shaft. The shaft $a$ is provided with a socket $d$ for the reception of the reduced end $e$ of the shaft $b$ (see Fig. 6). In the present instance, provision is made for rotating the shaft $b$ at three different speeds, and for this purpose, three sets of gears are provided.

One set of gears consists of a spur gear $f$ fast on the shaft $a$, which meshes with a spur gear $g$ loose on the counter shaft $c$. A second set consists of a spur gear $h$ loose on the shaft $b$, which meshes with a spur gear $i$ fast on the counter shaft $c$. A third set consists of the spur gear $j$ loose on the shaft $b$ which meshes with a gear $k$ fast on the shaft $c$. The gears $f$, $h$ and $j$ are adapted to be coupled to the driven shaft $b$ by means of a key 10 adapted to be moved longitudinally of the shaft $b$ in a key-way or slot 12 therein, the said key being designed to be engaged with one of the gears $f$, $h$ and $j$ according to the speed desired. The key 10 is pivoted at its rear end to a member 15 movable in the slot 12 and connected with a gear 16 so as to key the same to the shaft $b$ and to be moved with said gear longitudinally on the shaft $b$. The gear 16 is moved longitudinally on the shaft $b$ by an extensible lever comprising the members 18, 19, the member 19 being pivoted at 20 and having a socket 21 into which the member 18 extends.

The pivoted key 10 is provided at its front end with an enlargement or head 23 (see Fig. 8), preferably beveled in opposite directions as at 24, 25, and the gears $f$, $h$ and $j$ are provided with annular recesses 26 on their inner circumference and with lugs or projections 27 (see Figs. 3 and 7), which extend into said recesses and are adapted to be engaged by the head 23 on the pivoted key 10 so as to clutch or couple the gears $j$, $h$, $f$, to the shaft $b$. The pivoted key 10 is thrown out into the path of the lugs 27 by a spring 28. The shaft $b$ may be driven at different speeds by engaging the key 10 with the gears $j$, $h$, $f$. Provision is made for connecting the counter-shaft $c$ with the driving shaft $a$ when the shaft $b$ is to be driven at the low and intermediate speeds and to be disconnected from said driving shaft when the shaft $b$ is to be driven at high speed. This result may be accomplished as herein shown by means of a clutch which is connected with the lever 19 which moves the key. The clutch referred to, may be made as herein shown and comprises a hub 30, which is keyed to the counter shaft $c$ to move longitudinally thereon and is provided with one or more projections 31, which engage one or more projections or lugs 32 on the gear $g$, the lugs 32 being preferably made inclined to facilitate their engagement with the clutch hub 30. The clutch hub 30 is moved on the shaft $c$ by a lever 34 pivoted at 35 and connected with the lever 19 by a link or rod 36 having a slot 37 into which extends a pin 38 on the lever 19. This construction permits of a limited movement of the lever 19 without affecting the clutch hub, for a purpose as will be described. The clutch hub 30 is automatically maintained in engagement with the gear $g$ under conditions as will be described by a spring 39, the tension or power of which can be adjusted by the nut 40 engaging the threaded rod or bolt 41.

The key-operating lever 19 may be turned on its pivot 20, as herein shown, by moving a crank or handle 43 attached to a rock-shaft 44, which is provided with a second crank 45 joined by a rod or link 46 to the lever 19, the link 46 being connected to the lever 19 by a substantially universal joint, formed in the present instance by a block 47 which is pivoted in the forked end of the link or rod 46 and to which the lever 19 is pivoted at 48 substantially at right angles to the pivot 49 for said block.

By reference to Figs. 1 and 2, it will be seen that when the handle 43 is moved in the direction indicated by the arrow 50, the lever 19 is turned so as to move the gear 16 and the pivoted key in the direction indicated by the arrow 51.

The extent of movement of the handle 43 determines the speed at which the shaft $b$ is to be driven, for by moving the key 10 so that its head 23 registers with the annular recess in the gear $j$, the said head is projected out of its keyway into said recess by the spring 28 and is engaged by the lug 27 during rotation of the gear $j$, thereby clutching the shaft $b$ to the gear $j$, which is driven from the main shaft $a$ through the gears $f, g, k$. When it is desired to rotate the shaft $b$ at an intermediate speed, the key 10 is further moved in the direction indicated by the arrow 51 and its head 23 is brought into line with the annular recess of the gear $h$, into which recess said head is moved by the spring 28 and is engaged by the lug 27 on said gear, thereby clutching the shaft $b$ with the gear $h$, which is rotated from the shaft $a$ by the gears $f, g, i$. When it is desired to rotate the shaft $b$ at high speed, the key 10 is moved still further in the direction indicated by the arrow 51 until its head 23 registers with the annular recess 26 in the gear $f$, into which it is moved by the spring 28 and wherein it is engaged by the lug 27 on said gear, thereby clutching the shaft $b$ to the gear $f$ which is fast on the driving shaft $a$.

To facilitate engagement and disengagement of the key 10 with the gears $j$, $h$, and $f$, the side walls of the recesses 26 in said gears may be beveled or inclined as at 60, and the hub of the gear $j$ may also be beveled as at 61 (see Fig. 6).

From the above description and by reference to Fig. 1, it will be seen that the shaft $a$ is continuously driven and the gear $f$ fast thereon is rotated continuously, as is also the gear $g$. With the key lever 19 in the position shown in Fig. 1, the gear $g$ is clutched to the counter-shaft $c$ which is thus rotated continuously, and as the gears $i, k$ are fast on the counter-shaft, these gears are rotated continuously and drive the gears $h, j$ continuously. With the lever 19 in the position shown in Fig. 1, the clutch member 30 is held in engagement with the clutch member 32 on the gear $g$ by the spring 39, which maintains said engagement until the lever 19 is turned into the position it occupies when the key 10 is engaged with the gear $f$, at which time the pin 38 engages the end of its slot 37 and moves the link 36 so as to disengage the clutch member 30 from the gear $g$, thereby disconnecting the counter-shaft $c$ from the driving shaft $a$, and avoiding wear and noise from this source. The key operating lever 19 may be locked into the various positions into which it is moved by means of a pawl or dog 63 having a substantially V-shaped end which is adapted to be forced by a spring 64 into one of a series of V-shaped notches 65, 66, 67 in a curved bar 68, the notch 69 corresponding to the neutral or disengaged position of the key 10, and the notches 65, 66, 67 to the lower, intermediate and high speeds respectively. Provision is made for reversing the rotation of the shaft $b$, and for this purpose, the shaft $c$ has fast on it a gear 70, which meshes with an intermediate gear 71 mounted on a stud shaft 72 (see Fig. 5) supported by the framework 73 and with which the gear 16 is adapted to be engaged by moving the operating handle 19 in the direction opposite to that indicated by the arrow 50.

To prevent accidental reversal of the driven shaft, the handle 43 carries a locking dog or pawl 75, which is normally pressed by a spring 76 into position to engage a shoulder 77 on the bar 68, so that if it should be attempted to reverse the handle without first lifting up the locking dog 75, the latter would engage the shoulder 77 and thereby prevent movement of the handle until the dog 75 is lifted, which may be accomplished by a finger or lever 80 pivoted to the handle 43 and connected by a link 81 to the locking dog 75.

By providing the gears $f$, $h$ and $j$ with annular recesses on their inner circumference, ample opportunity is afforded for the engagement of the head of the key with the lugs 27 extended into said recesses, thereby insuring the driven shaft being coupled to the said gears even when the latter are rotating at high speed.

Claims.

1. In an apparatus of the character described, in combination, a driving shaft, a gear fast thereon, a driven shaft in alinement with said driving shaft, a plurality of gears loose thereon, a counter-shaft, a gear normally loose thereon and meshing with the gear on said driving shaft, a plurality of gears fast on said counter-shaft and meshing with the gears on said driven shaft, a clutch coöperating with the gear normally loose on the counter-shaft to render the same fast thereon, a clutch mechanism coöperating with the gears normally loose on the driven shaft to render said gears fast on said driven shaft, and mechanism for operating said clutches, substantially as described.

2. In an apparatus of the character described, in combination, a driving shaft, a gear fast thereon, a driven shaft having a key-way, a plurality of gears loose on said shaft and having an annular recess on their inner circumference provided with a lug or projection, a counter-shaft, a gear normally loose thereon and meshing with the gear on the driving shaft, a clutch to render the loose gear on said counter-shaft fast thereon, a plurality of gears fast on the counter-shaft and meshing with the gears on the driven shaft, a pivoted key movable in the said key-way and coöperating with the lugs of the gears on said driven shaft to clutch the said gears to said driven shaft, and means to move said key, substantially as described.

3. In an apparatus of the character described, in combination, a main shaft, a gear fast thereon, a driven shaft provided with a longitudinal key-way, a plurality of gears normally loose on said driven shaft, a counter shaft, gears thereon in mesh with the gears on said driving and driven shafts, a key movable in said key-way and coöperating with the gears on said drive shaft to couple the said gears to said shaft, a gear movable longitudinally on said driven shaft and keyed thereto, a gear fast on said counter shaft, and an intermediate gear meshing with the gear on said counter shaft and adapted to be engaged by the gear movable on said driven shaft, a lever to move the gear longitudinally on said driven shaft, a rock-shaft, means to connect the said lever to said rock shaft, a handle on said rock shaft, a notched bar, a pawl or dog carried by said handle and coöperating with the notches in said bar, and a second pawl or dog carried by said handle and engaging said bar to prevent movement of the said handle to reverse rotation of the driven shaft until said second pawl or dog is disengaged from said bar, substantially as described.

4. In an apparatus of the character described, in combination, a rotatable shaft having a longitudinal key-way, a gear normally loose on said shaft, a key movable in said key-way and coöperating with said gear to couple the same to said shaft when said key is moved in one direction, a second gear secured to said key to move therewith, a third gear with which the gear attached to the key coöperates when said key is moved in the reverse direction, means to rotate said third gear and produce reverse rotation of the said rotatable shaft when said sliding gear is in mesh with said third gear, mechanism for moving said key and the gear attached thereto longitudinally on said shaft, and means for limiting the movement of said mechanism to prevent accidental reversal of the rotatable shaft, substantially as described.

5. In an apparatus of the character described, in combination, a driving shaft, a gear fast thereon, a counter-shaft, a gear normally loose on said counter-shaft, a clutch on the counter-shaft to render the said loose gear fast thereon, a gear fast on said counter-shaft, a driven shaft, a gear normally loose thereon and meshing with the gear fast on said counter-shaft, a key coöperating with the gear loose on the driven shaft to render the same fast on said shaft and also coöperating with the gear fast on the driving shaft to connect the driven shaft directly with said driving shaft, a lever to move said key, a lever to operate the clutch on the counter-shaft, and means to connect said clutch-operating lever with said key-operating lever, substantially as described.

6. In an apparatus of the character described, in combination, a driving shaft, a gear fast thereon, a counter-shaft, a gear normally loose on said counter-shaft, a clutch on the counter-shaft to render the said loose gear fast thereon, a gear fast on said counter-shaft, a driven shaft, a gear normally loose thereon and meshing with the gear fast on said counter-shaft, a key coöperating with the gear loose on the driven shaft to render the same fast on said shaft and also coöperating with the gear fast on the driving shaft to connect the driven shaft directly with said driving shaft, a lever to move said key, a lever to operate the clutch on the counter-shaft, a spring to normally engage said clutch with its coöperating gear, and means for connecting said clutch-operating lever with said key-operating lever, said means having provision for permitting the key-operating lever to be moved independently of said clutch lever, substantially as described.

In testimony whereof, I have signed my name to this specification in the presence of two subscribing witnesses.

JOHN A. DE VITO.

Witnesses:
   JAS. H. CHURCHILL,
   J. MURPHY.